US010848916B2

(12) United States Patent
Kondo

(10) Patent No.: US 10,848,916 B2
(45) Date of Patent: Nov. 24, 2020

(54) SERVICE PROVISION DEVICE, SERVICE PROVISION METHOD, AND PROGRAM STORAGE MEDIUM

(71) Applicant: NEC Corporation, Tokyo (JP)

(72) Inventor: Nobuhiko Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 67 days.

(21) Appl. No.: 16/303,262

(22) PCT Filed: May 17, 2017

(86) PCT No.: PCT/JP2017/018526
§ 371 (c)(1),
(2) Date: Nov. 20, 2018

(87) PCT Pub. No.: WO2017/204053
PCT Pub. Date: Nov. 30, 2017

(65) Prior Publication Data
US 2020/0186968 A1 Jun. 11, 2020

(30) Foreign Application Priority Data

May 23, 2016 (JP) .................................. 2016-102577

(51) Int. Cl.
*H04W 4/02* (2018.01)
*H04W 4/029* (2018.01)
(Continued)

(52) U.S. Cl.
CPC ............ *H04W 4/029* (2018.02); *G01S 19/14* (2013.01); *H04W 12/1202* (2019.01); *H04W 64/00* (2013.01)

(58) Field of Classification Search
CPC . H04W 4/029; H04W 12/1202; H04W 64/00; H04W 4/021; H04W 4/027;
(Continued)

(56) References Cited

U.S. PATENT DOCUMENTS

| 8,768,382 | B1 * | 7/2014 | Gordin | ................. | H04W 24/00 |
| | | | | | 455/456.1 |
| 2003/0109265 | A1 * | 6/2003 | Yamamoto | ................ | G01S 5/02 |
| | | | | | 455/456.1 |

(Continued)

FOREIGN PATENT DOCUMENTS

| JP | 2002-164834 A | 6/2002 |
| JP | 2004-032367 A | 1/2004 |

(Continued)

OTHER PUBLICATIONS

International Search Report for PCT Application No. PCT/JP2017/018526, dated Aug. 15, 2017.

(Continued)

*Primary Examiner* — Nathan S Taylor

(57) ABSTRACT

A service provision device is provided with: third-party measurement request means and service provision means. The third-party measurement request means requests measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs. The service provision means provides the service to the mobile terminal, based on position information of the mobile terminal acquired in response to the requesting by the third-party measurement request means and position information of the mobile terminal measured by a measurement unit provided in the mobile terminal.

11 Claims, 8 Drawing Sheets

(51) Int. Cl.
*H04W 12/12* (2009.01)
*G01S 19/14* (2010.01)
*H04W 64/00* (2009.01)

(58) Field of Classification Search
CPC ..... H04W 64/006; H04W 4/022; H04W 4/21;
H04W 4/02; H04W 4/20; G01S 19/14;
H04L 67/22; H04L 51/20; H04L 51/32;
H04L 67/306; H04L 12/58; H04L 29/08;
G06F 15/16; G06F 16/00; G06F 16/29;
G06F 17/30; G06Q 50/00
USPC .......................................................... 709/206
See application file for complete search history.

(56) References Cited

U.S. PATENT DOCUMENTS

| | | | |
|---|---|---|---|
| 2004/0081120 A1* | 4/2004 | Chaskar | H04L 51/20 370/328 |
| 2004/0267840 A1 | 12/2004 | Ono | |
| 2005/0065725 A1* | 3/2005 | Jeon | G01S 19/05 701/469 |
| 2008/0309550 A1 | 12/2008 | Sairo et al. | |
| 2009/0021426 A1* | 1/2009 | Yeh | G01S 19/06 342/357.43 |
| 2011/0098057 A1* | 4/2011 | Edge | G01S 5/0045 455/456.1 |
| 2011/0169691 A1* | 7/2011 | Thomson | G01S 19/09 342/357.42 |
| 2013/0002477 A1 | 1/2013 | Dehnie et al. | |
| 2013/0217418 A1* | 8/2013 | Maurin | H04W 4/029 455/456.3 |
| 2013/0260749 A1* | 10/2013 | Annamalai | H04W 8/02 455/432.3 |
| 2013/0311764 A1* | 11/2013 | Alpert | H04W 12/0013 713/150 |
| 2015/0230057 A1* | 8/2015 | Jiang | H04W 64/00 455/404.2 |
| 2015/0264564 A1 | 9/2015 | Vanderhulst et al. | |
| 2016/0173623 A1* | 6/2016 | Broussard | H04L 63/107 713/168 |
| 2016/0182424 A1* | 6/2016 | Maginnis | H04L 51/20 709/206 |
| 2018/0054796 A1* | 2/2018 | Edge | H04W 4/02 |

FOREIGN PATENT DOCUMENTS

| | | |
|---|---|---|
| JP | 2004-233071 A | 8/2004 |
| JP | 2009-042858 A | 2/2009 |
| JP | 2010-206702 A | 9/2010 |
| JP | 2012/178715 A | 9/2012 |
| WO | 02/21873 A1 | 3/2002 |
| WO | 2008/010287 A1 | 1/2008 |
| WO | 2012/054885 A2 | 4/2012 |
| WO | 2013/173215 A1 | 11/2013 |

OTHER PUBLICATIONS

English translation of Written opinion for PCT Application No. PCT/JP2017/018526.
Extended European Search Report for EP Application No. EP17802645.6 dated May 14, 2019.

* cited by examiner

Fig. 4

| CARRIER IDENTIFICATION INFORMATION | | | THIRD-PARTY MEASUREMENT REQUEST DESTINATION |
|---|---|---|---|
| APN | MNC | MCC | |
| XXX | 100 | 10 | AGPS SERVER OF COMPANY A |
| YYY | 200 | 20 | AGPS SERVER OF COMPANY B |
| ZZZ | 300 | 30 | AGPS SERVER OF COMPANY C |

SERVICE PROVISION DEVICE, SERVICE PROVISION METHOD, AND PROGRAM STORAGE MEDIUM

This application is a National Stage Entry of PCT/JP2017/018526 filed on May 17, 2017, which claims priority from Japanese Patent Application 2016-102577 filed on May 23, 2016, the contents of all of which are incorporated herein by reference, in their entirety.

TECHNICAL FIELD

The present invention relates to a technology for preventing arrogation of position information.

BACKGROUND ART

Currently, in most cases, a mobile terminal such as a mobile phone or a smart phone has a present position measurement function for specifying a position of the mobile terminal by use of a global positioning system (GPS) function and the like.

The mobile terminal may send a position measured by the above-mentioned function to an application (hereinafter also referred to as "app") executed on the mobile terminal or to a server through a wireless network connection. In this manner, in some cases, the mobile terminal is capable of providing a service and other functions for a user of the mobile terminal by use of the position. For example, the mobile terminal may provide a user with a map service, a navigation service, and information on neighbor restaurants and shops.

Present position measurement is performed by use of a position measurement function mounted to the mobile terminal by the mobile terminal itself, for example, on the occasion of a request for acquisition of position information by an application installed on the mobile terminal. Such a present position measurement function is also referred to as a "self-position measurement function".

Position information acquired by the self-position measurement function as described above can be modified at a level of an operating system (OS) or an application, and hence the position information may be arrogated. When the position information from the mobile terminal is arrogated, a considerable loss is caused for some venders who provide a service associated with position information.

On the other hand, in addition to the above-mentioned present position measurement function, in some cases, the mobile terminal may have a position providing function in response to a request from a third party for the purpose of specifying a position of a caller by an emergency information organization at the time of emergency information transmission, confirming the place of a child by a parent, or the like. Such a position providing function is also referred to as "third-party measurement function". The third-party measurement is performed in such a way that the mobile terminal performs position measurement in response to a request for acquisition of position information from a server that is a third party, which is different from the mobile terminal and a carrier, and a result thereof is returned to the server.

In most cases, the third-party measurement is achieved by a chip standardly mounted to the mobile terminal, and hence position information is difficult to be modified at a level of an OS or an application. Thus, the third-party measurement is suitable for acquisition of position information without being arrogated.

A technology for preventing arrogation of position information is disclosed in, for example, PTL 1. In PTL 1, there is disclosed a technology for detecting arrogation by comparison between a measurement result based on GPS and base station location information.

Further, in PTL 2, there is disclosed a technology for preventing modification of position information by an application or an OS by encrypting the information on a terminal side by use of dedicated hardware and decrypting the information on a server side.

CITATION LIST

Patent Literature

[PTL 1] International Publication WO2008/010287
[PTL 2] International Publication WO2013/173215

SUMMARY OF INVENTION

Technical Problem

As described above, the third-party measurement is advantageous in acquiring position information without being arrogated. However, using the third-party measurement, only functions provided by a mobile network operator (hereinafter also referred to as "carrier") who holds base station location information of the mobile terminal are available. In other words, only position information regarding the mobile terminals contracting with the carrier can be acquired using the third-party measurement.

Thus, a carrier or an application provider needs to use position information based on self-position measurement to develop a service to a mobile terminal which belongs to a different carrier and whose base station location information is not held by the mobile terminal's carrier, the position information being reported from the mobile terminal. Therefore, there is a problem that the position information may be arrogated.

With the technology in PTL 1, position information can only be acquired on a mobile terminal contracting with a carrier. Further, with the technology in PTL 2, additional hardware is required to be mounted for the purpose of preventing modification of position information.

The present invention has been made in view of the above-mentioned problems, and has a main object to provide a service provision device and the like which are capable of preventing arrogation of position information without relying on a mobile network operator and without requiring additional hardware.

Solution to Problem

A service provision device according to one aspect of the present invention includes:

third-party measurement request means for requesting measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs; and service provision means for providing the service to the mobile terminal, based on position information of the mobile terminal acquired in response to the requesting by the third-party measurement request means and position information of the mobile terminal measured by a measurement unit provided in the mobile terminal.

A service provision method according to one aspect of the present invention includes:

requesting measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs; and providing the service to the mobile terminal, based on position information of the mobile terminal acquired in response to the requesting to the third-party measurement device and position information of the mobile terminal measured by a measurement unit provided in the mobile terminal.

A program storage medium according to one aspect of the present invention stores a program causing a computer to execute:

a processing of requesting measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs; and a processing of providing the service to the mobile terminal, based on position information of the mobile terminal acquired in response to the requesting to the third-party measurement device and position information of the mobile terminal measured by a measurement unit provided in the mobile terminal.

Advantageous Effects of Invention

According to the present invention, an effect of being capable of preventing arrogation of position information can be obtained without relying on a mobile network operator and without requiring additional hardware.

BRIEF DESCRIPTION OF DRAWINGS

FIG. 4 is a diagram illustrating an example of request destination information of third-party measurement, which is provided by a service server of the service provision system according to the second example embodiment of the present invention.

EXAMPLE EMBODIMENT

Now, with reference to the drawings, detailed description is made of example embodiments of the present invention.

First Example Embodiment

Figure 1:
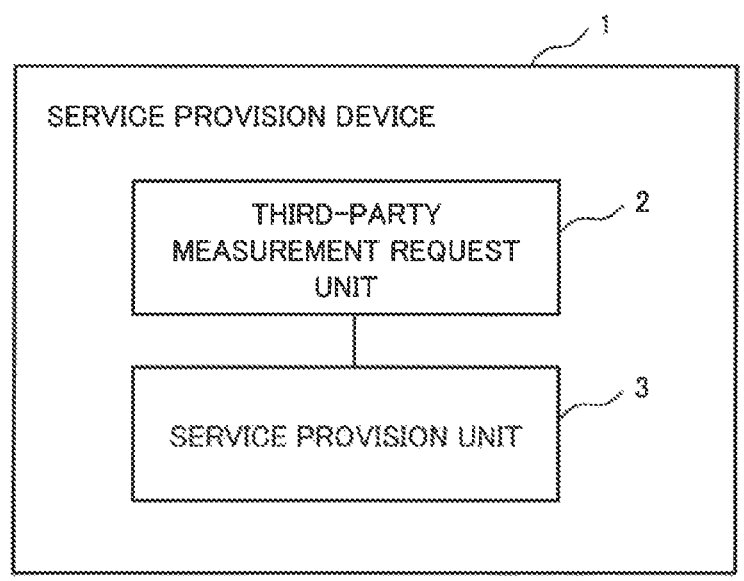
FIG. 1 is a block diagram illustrating a configuration of a service provision device 1 according to a first example embodiment of the present invention.

FIG. 1 is a block diagram illustrating a configuration of a service provision device 1 according to a first example embodiment of the present invention. As illustrated in FIG. 1, the service provision device 1 includes a third-party measurement request unit 2 and a service provision unit 3.

The third-party measurement request unit 2 requests position measurement of a mobile terminal to a third-party measurement device when the third-party measurement request unit 2 receives a request for providing a service associated with position information from the mobile terminal. Information of the third-party measurement device is stored in advance, and the third-party measurement device is associated with a mobile communication network. The service provision unit 3 provides the service to the mobile terminal based on position information of the mobile terminal acquired in response to the request from the third-party measurement request unit 2 and position information of the mobile terminal measured by a measurement unit provided in the mobile terminal. Note that, as an example, the third-party measurement request unit 2 and the service provision unit 3 are implemented as a third-party measurement request unit 123 and a service request receiving unit 121, respectively, to be described in the following example embodiment.

With the above-mentioned configuration, according to the first example embodiment, the service provision device 1 can assign a third-party measurement request destination to each mobile communication network to which the mobile terminal belongs. Thus, the effect of being capable of preventing arrogation of position information can be obtained without relying on a mobile network operator and without requiring additional hardware.

Second Example Embodiment

Figure 2:
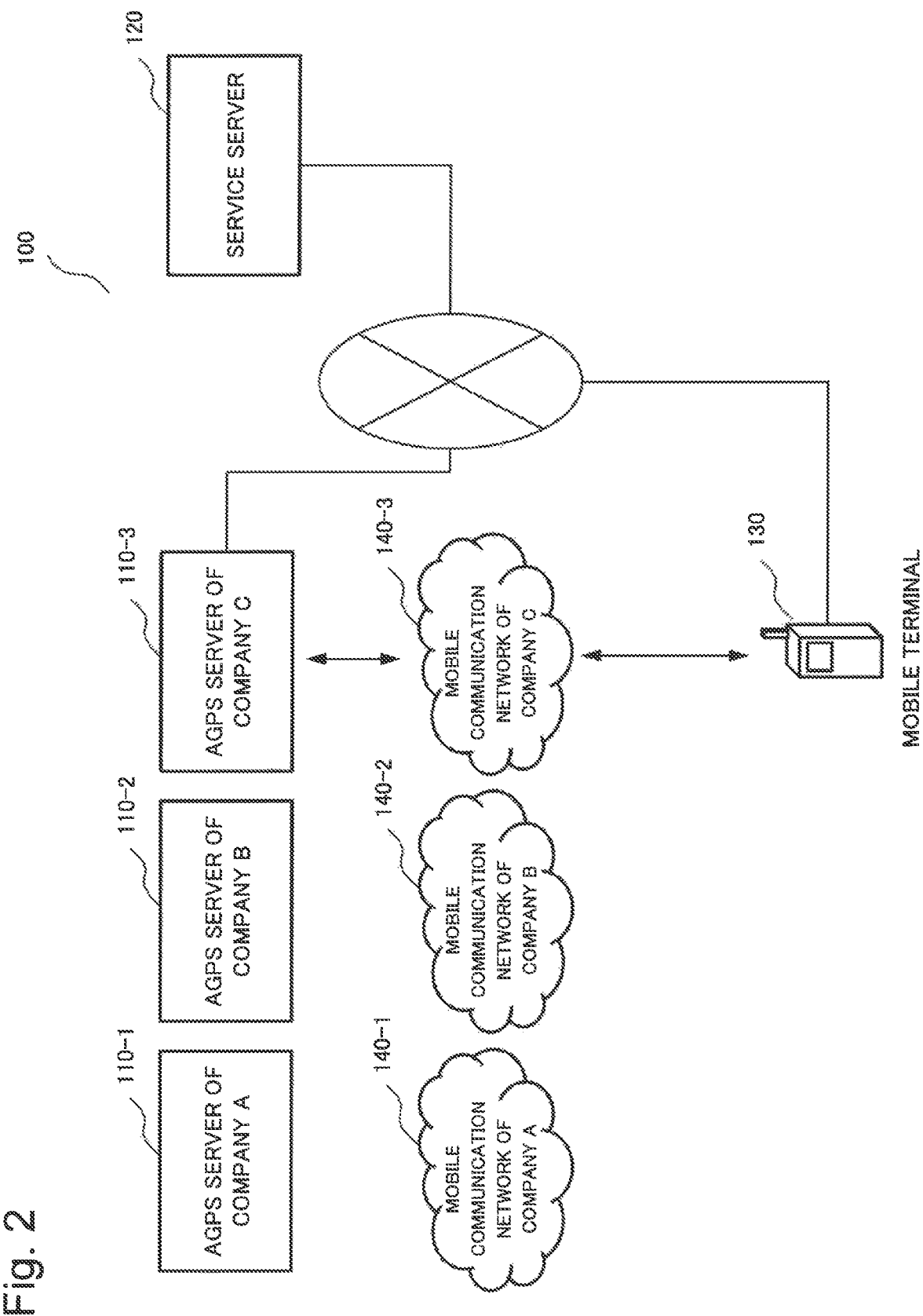
FIG. 2 is a diagram illustrating a configuration example of a service provision system according to a second example embodiment of the present invention.

FIG. 2 is a diagram illustrating a configuration example of a service provision system 100 according to a second example embodiment of the present invention. In FIG. 2, Company A, Company B, and Company C are third-party measurement service providers including carriers that provide mobile communication networks. Each company has assisted GPS (AGPS) servers 110-1 to 110-3. The AGPS servers 110-1 to 110-3 have a function of providing a third-party measurement service to mobile terminals belonging to mobile communication networks 140-1 to 140-3 of each of the company using a function mounted to chips or the like in advance on the mobile terminals. With the third-party measurement service, the mobile terminal performs position measurement in response to a position information acquisition request (third-party measurement request) from a server that is a third-party different from the mobile terminal and the carrier, or the like, and the result is returned to the server.

In FIG. 2, it is illustrated that a mobile terminal 130 belongs to the mobile communication network 140-3 of Company C and communicates with the AGPS server 110-3 through the mobile communication network 140-3. The AGPS servers 110-1 to 110-3 each have a similar configuration, and hence are described as "AGPS server 110" as a representative in the following description.

The service provision system 100 includes a service server 120. The service server 120 is a server operated by an application provider for the mobile terminal 130. The service server 120 operates cooperatively with an application installed in the mobile terminal 130. For example, the service server 120 provides a service in such a manner that the service server 120 provides the mobile terminal 130 with information on stores in the vicinity of the mobile terminal in accordance with a location in which the mobile terminal 130 is present, and enables the information to be displayed on the mobile terminal 130 by the application. The AGPS server 110, the service server 120, and the mobile terminal 130 are connected to each other in a communicable manner. The service server 120 is also referred to as a service provision device.

Figure 3:
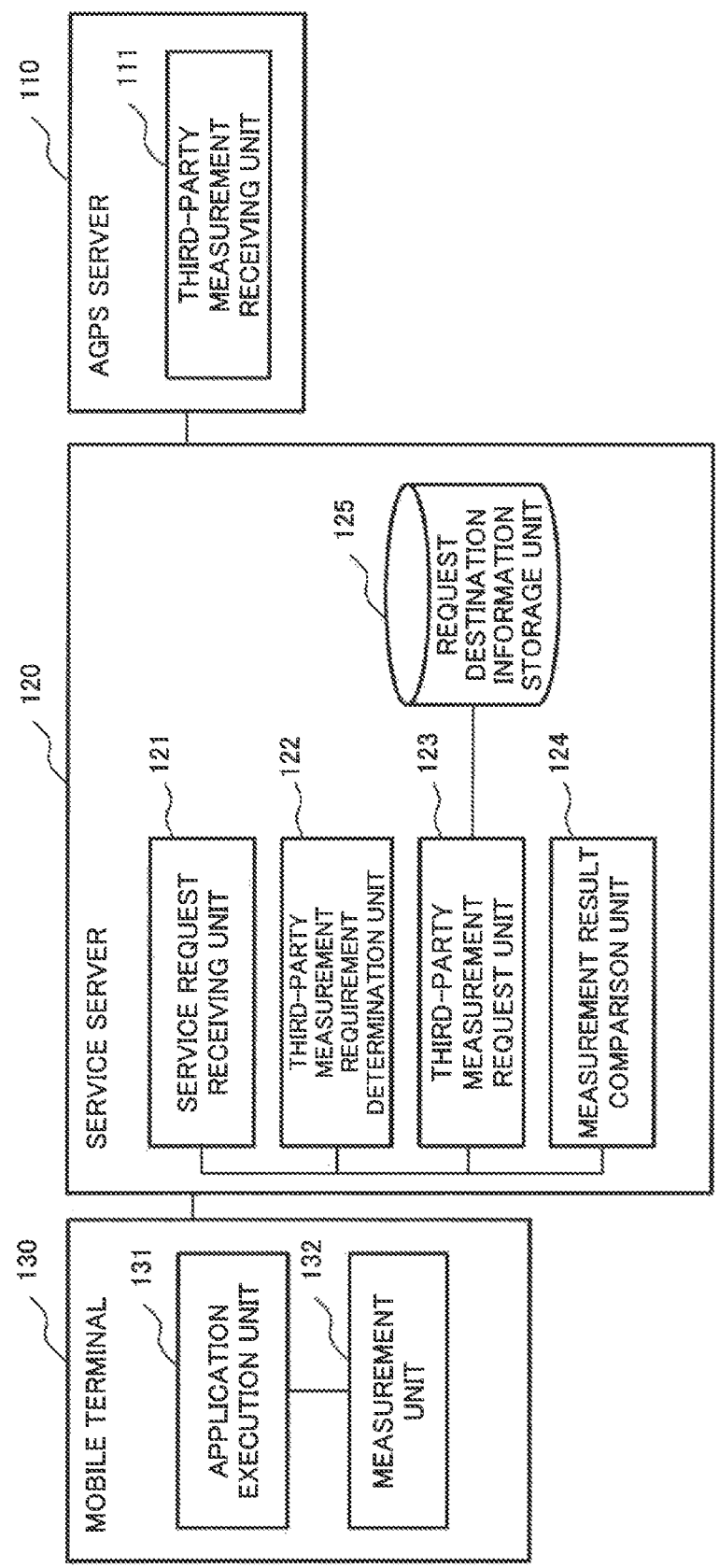
FIG. 3 is a function block diagram for each component of the service provision system according to the second example embodiment of the present invention.

FIG. 3 is a function block diagram for each component of the service provision system 100 according to a second example embodiment of the present invention. As illustrated in FIG. 3, the mobile terminal 130 includes an application execution unit 131 and a measurement unit 132. The service server 120 includes the service request receiving unit 121, a third-party measurement requirement determination unit 122, the third-party measurement request unit 123, a measurement result comparison unit 124, and a request destination information storage unit 125. The AGPS server 110 includes a third-party measurement receiving unit 111. The service request receiving unit 121 is also referred to as a service provision means. The measurement result comparison unit 124 is also referred to as a comparison means.

The application execution unit 131 of the mobile terminal 130 executes an installed application, for example, the above-mentioned application that acquires the information of the shops in the vicinity and displays the information. The measurement unit 132 measures a position of the mobile terminal 130 in response to a position information acquisition request from the application being executed by the application execution unit 131, for example.

The service request receiving unit 121 of the service server 120 receives a request for the service from the mobile terminal 130. The third-party measurement requirement determination unit 122 determines whether or not the third-party measurement is required. When it is determined by the third-party measurement requirement determination unit 122 that the third-party measurement is required, the third-party measurement request unit 123 sends a request for the third-party measurement. The measurement result comparison unit 124 compares the position information of the mobile terminal 130 acquired by the third-party measurement with the position information measured by the measurement unit 132 provided in the mobile terminal 130.

The request destination information storage unit 125 stores request destination information of the third-party measurement. The third-party measurement is performed by the third-party measurement service provider for each mobile communication network to which the mobile terminal belongs. The mobile communication network to which the mobile terminal belongs refers to a mobile communication network provided by a mobile network operator who holds base station location information of the mobile terminal. FIG. 4 is a diagram illustrating an example of the request destination information of the third-party measurement. As illustrated in FIG. 4, the request destination information of the third-party measurement includes carrier identification information and third-party measurement request destination associated with the carrier identification information.

The carrier identification information includes access point names (APNs), mobile network codes (MNCs), and mobile country codes (MCCs) (the detailed description of which is given later). The third-party measurement request destination is a third-party measurement service provider (third-party measurement device) corresponding to a carrier, and may be, for example, an Internet protocol (IP) address of the AGPS server that the carrier to which the mobile terminal belongs holds.

When the third-party measurement receiving unit 111 of the AGPS server 110 receives a request of the third-party measurement from the service server 120, the third-party measurement receiving unit 111 requests measurement to the mobile terminal 130. The AGPS server 110 is a server for achieving an AGPS function, and is provided for each carrier.

Note that, the third-party measurement requested from the third-party measurement receiving unit 111 of the AGPS server 110 is a function provided by the carrier (third-party measurement service provider) as described above. The position information is acquired by the chip standardly mounted to the mobile terminal 130, and hence is not modified by the OS or the application.

Figure 5:
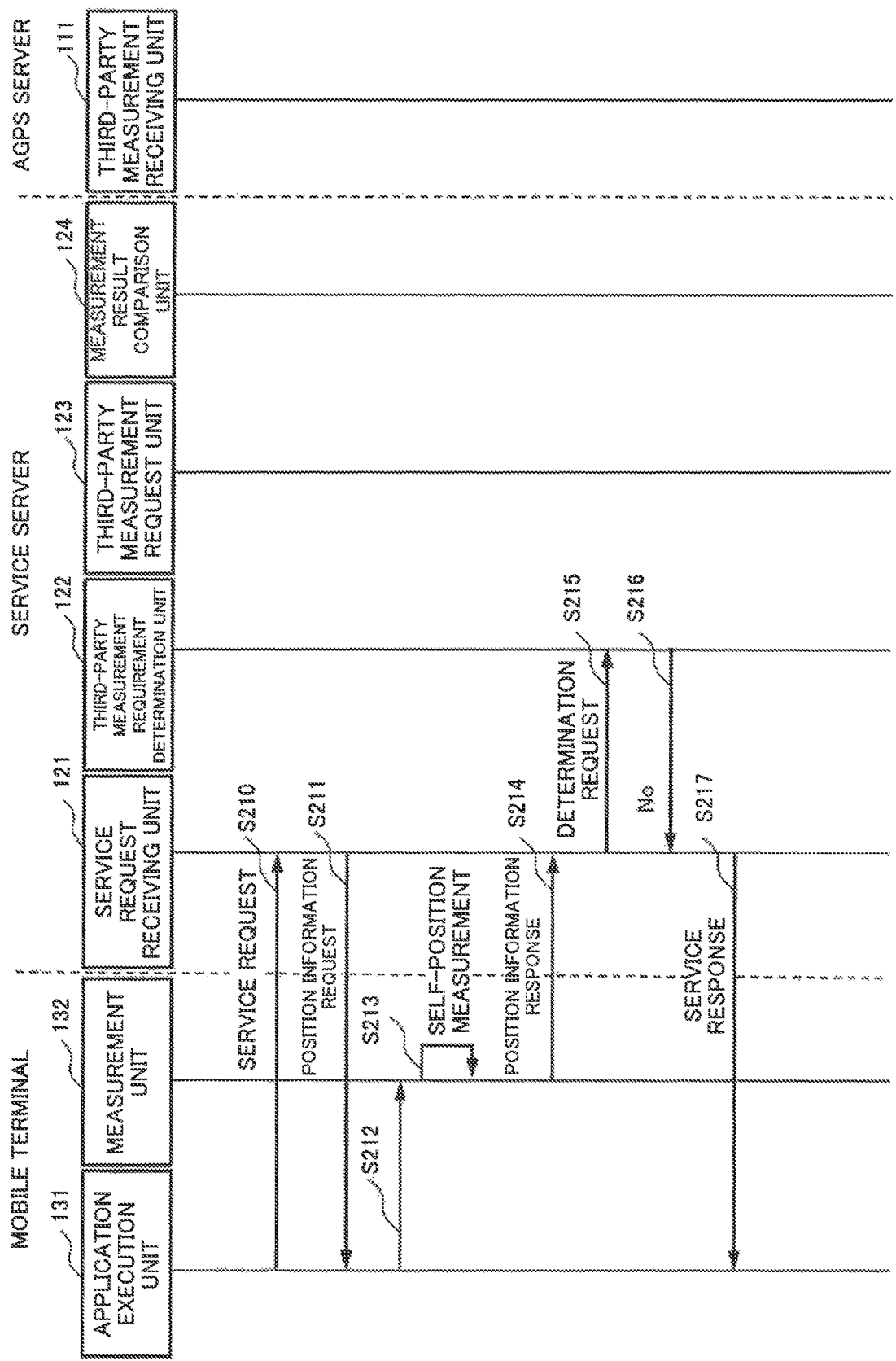
FIG. 5 is a diagram illustrating an operation in the service provision system according to the second example embodiment of the present invention, performing only self-position measurement.

Now, detailed description is made of an operation of each component of the service provision system 100. First, description is made of an operation of the service provision system 100 in a case where only self-position measurement is performed. FIG. 5 is a diagram illustrating an operation of the service provision system 100 in a case where only self-position measurement is performed. Here, it is assumed that the mobile terminal 130 belongs to the mobile communication network of Company C.

For example, the application execution unit 131 in the mobile terminal 130 send a request (service request) for the service of providing information of shops in the vicinity to the service server 120 through a communication means (S210). At this time, the application execution unit 131 sends information (APN, MNC, MCC, and the like) to the service server 120 with being included in the service request, the information indicating the mobile communication network to which the own terminal belongs (hereinafter, also referred to as "network information") and being held in the mobile terminal 130.

APN is identification information indicating a gateway from a mobile phone channel to another network, and has a specific value set by each of the mobile network operators including a mobile virtual network operator (MVNO). MNC is an identification number indicating a carrier. MCC is an identification number indicating an operation area of the carrier. At least any one of those pieces of information is included in the service request, and sent to the service server 120.

In the service server 120, the service request receiving unit 121 receives the service request. The service request receiving unit 121 requests position information to the application execution unit 131 of the mobile terminal 130 (S211).

The application execution unit 131 instructs the measurement unit 132 to perform the self-position measurement (S212). In response to the above-mentioned instruction, the measurement unit 132 performs the self-position measurement by itself (stand-alone GPS) or using the AGPS server 110 of Company C or other position information detection functions (S213). The measurement unit 132 returns the position information of the mobile terminal obtained as a result of the self-position measurement to the service server 120 (S214).

When the service request receiving unit 121 receives the position information from the mobile terminal 130, the service request receiving unit 121 requests determination of whether or not the third-party measurement is required to the third-party measurement requirement determination unit 122 (S215). In response to the request from the service request receiving unit 121, the third-party measurement requirement determination unit 122 determines whether or not the third-party measurement is required.

As references for determination that the measurement is required, i.e., as timings to perform the measurement, the following cases are conceivable. In other words, it is conceivable that (1) the measurement is performed when a predetermined time period elapses from the last service request; (2) the measurement is performed for each of a predetermined number of service times; (3) the measurement is always performed for a specific service; (4) the measurement is performed when a result of the self-position measurement is separated from a measurement result of the last service by a predetermined distance; (5) the measurement is performed when the measurement result of the last service is suspected to be arrogated, i.e., when a comparison-determination result of the measurement result, which will be described later, is "false"; (6) the measurement is performed at random; and the like.

The above-mentioned result of the determination by the third-party measurement requirement determination unit 122 assumed to be "No", i.e., the third-party measurement is assumed not to be required (S216). The service request receiving unit 121 provides (responds with or to) a service based on the notified position information, for example, a service of notifying shop information associated with position information registered in advance, to the mobile terminal 130 (S217).

Figure 6A:
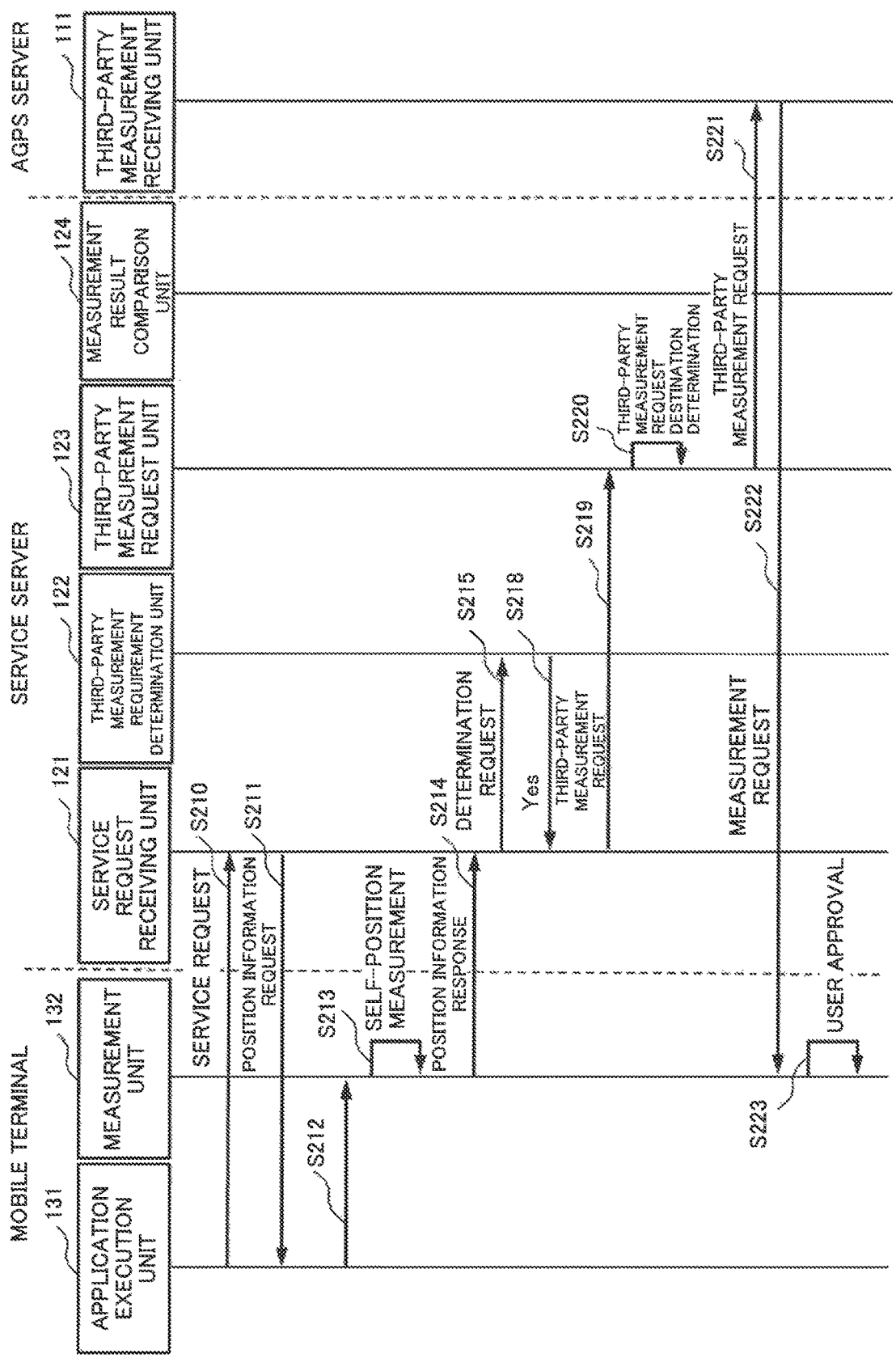
FIG. 6A is a diagram illustrating an operation in the service provision system according to the second example embodiment of the present invention, performing third-party measurement.
Figure 6B:
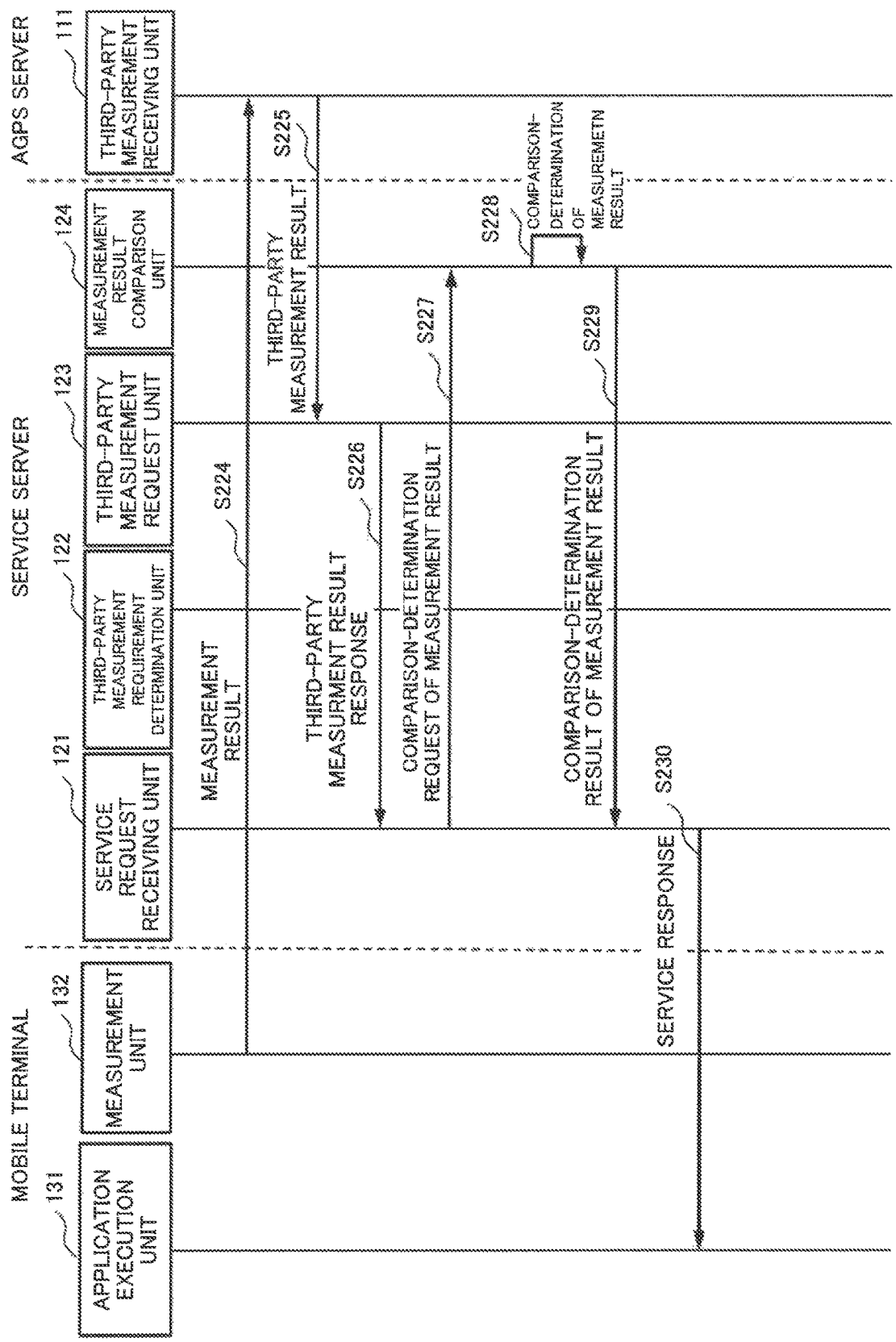
FIG. 6B is a diagram illustrating an operation in the service provision system according to the second example embodiment of the present invention, performing third-party measurement.

Next, with reference to FIG. 6A and FIG. 6B, description is made of an operation of the service provision system 100 in a case where the third-party measurement is performed. FIG. 6A and FIG. 6B are diagrams illustrating the operation of the service provision system 100 in the case where the third-party measurement is performed.

Steps S210 to S215 illustrated in FIG. 6A are similar to those in FIG. 5, and hence detailed description thereof is omitted. In a case where the determination result from the third-party measurement requirement determination unit 122 shown in Step S215 is "Yes" (S218), i.e., in the case where the third-party measurement is performed, the service request receiving unit 121 sends a request to the third-party measurement to the third-party measurement request unit 123 (S219).

When the third-party measurement request unit 123 receives the above-mentioned request, the third-party measurement request unit 123 determines a request destination of the third-party measurement based on the network information acquired in Step S210 (S220). In other words, the third-party measurement request unit 123 reads out the third-party measurement request destination corresponding to at least any one of APN, MNC, and MCC, which is acquired from the mobile terminal 130 as the network information, from the request destination information storage unit 125.

The third-party measurement request unit 123 sends a request the third-party measurement to the read third-party measurement request destination (S221). Here, the third-party measurement request unit 123 requests the third-party measurement of the mobile terminal 130 to the AGPS server 110 belong to Company C. The AGPS server 110 receives the above-mentioned request of the third-party measurement by the third-party measurement receiving unit 111.

The third-party measurement receiving unit 111 sends a measurement request to the mobile terminal 130 that receives the request of the third-party measurement (S222). At this time, when the third-party measurement receiving unit 111 cannot detect the mobile terminal 130, i.e., when the mobile terminal 130 is not detected that it belongs to the mobile communication network of Company C, the measurement fails. In this case, it can be detected that the network information notified from the mobile terminal 130 in Step S210 is arrogated.

When the mobile terminal 130 receives the measurement request from the AGPS server 110, the mobile terminal 130 displays a user approval request on a display or the like. The mobile terminal 130 may notify the user approval request by sound and the like. In a case where a user approves the third-party measurement, the user inputs approval with respect to the user approval request (S223).

Subsequently, as illustrated in FIG. 6B, when the measurement unit 132 receives the approval from the user, the measurement unit 132 performs the measurement by use of AGPS or other methods, and returns the measurement result to the AGPS server 110 (S224). In a case where AGPS is used, for example, the measurement unit 132 acquires satellite orbit data from the AGPS server 110 based on position information of a base station in which the own terminal is located, and measures a position of the own terminal based on the satellite orbit data and a time signal for measuring a distance from the satellite. The acquisition of the position by the third-party measurement is not limited to be performed by use of AGPS, but it is sufficient that accurate position information of the mobile terminal can be acquired. For example, the position information may be acquired based on an electronic wave condition from one or plurality of base stations that the mobile terminal communicates with, or position information of an access point that the mobile terminal is communicable with may be acquired as the position information of the mobile terminal.

The third-party measurement receiving unit 111 provides the acquired result of the third-party measurement as a response to the third-party measurement request from the third-party measurement request unit 123 of the service server 120 (S225). When the third-party measurement request unit 123 receives the result of the third-party measurement, the third-party measurement request unit 123 provides the received result of the third-party measurement to the service request receiving unit 121 (S226).

Subsequently, to the measurement result comparison unit 124, the service request receiving unit 121 requests comparison-determination between the result of the self-position measurement performed by the mobile terminal 130 and the result of the third-party measurement performed by the AGPS server 110 (S227). In response to the above-mentioned request, the measurement result comparison unit 124 performs the comparison-determination between the result of the self-position measurement performed by the mobile terminal 130 and the result of the third-party measurement performed by the AGPS server 110 (S228). The measurement result comparison unit 124 compares the result of the self-position measurement with the result of the third-party measurement, and determines whether arrogation is performed.

When predetermined conditions are satisfied, the measurement result comparison unit 124 may determine that arrogation is or is not performed. For example, it may be determined that arrogation is performed in the following cases. That is, it may be determined that arrogation is performed: (1) when there is greater than a certain distance with respect to a difference between a measurement time of the result of the self-position measurement and a measurement time of the result of the third-party measurement (when the mobile terminal moves at greater than a certain speed); (2) when a distance with respect to the difference between the measurement time of the result of the self-position measurement and the measurement time of the result of the third-party measurement exceeds a threshold value in a predetermined number of times or more in series (when the mobile terminal moves at greater than a certain speed in series); and (3) when there is greater than a certain distance from the time and the position indicating the last measurement result even when the result of the self-position measurement and the result of the third-party measurement are close to each other (when the mobile terminal moves at greater than a certain speed).

The measurement result comparison unit 124 returns the above-mentioned result of the comparison-determination of the measurement result to the service request receiving unit 121 (S229). As a result of the comparison-determination of the measurement result, when the position information is legitimate, the service request receiving unit 121 sends shop information corresponding to the position information registered in advance in the service server 120 based on the notified position information to the mobile terminal 130 as a service response (S230).

Through the above-mentioned steps, the service server 120 can provide a service to the mobile terminal 130 based on the legitimate position information.

As described above, according to the second example embodiment, the service server 120 of the service provision system 100 includes information indicating the third-party measurement request destination associated with the carrier identification information. When a service request is received from the mobile terminal 130, the service server 120 requests the third-party measurement from the third-party measurement request destination corresponding to the mobile communication network to which the mobile terminal 130 belongs. The third-party measurement request destination requests the third-party measurement for the mobile terminal having requested a service, and returns the resultant position information to the service server 120. The service server 120 compares the resultant position information of the third-party measurement with the resultant position information of the self-position measurement, and determines whether arrogation of the position information is performed.

With the above-mentioned configuration, according to the second example embodiment, the service server 120 can assign the third-party measurement request destination to each mobile communication network to which the mobile terminal 130 belongs, and hence the effect of being capable of preventing arrogation of the position information without relying on a mobile network operator, i.e., with respect to the mobile terminal belonging to any mobile network operator, can be obtained. The service provision system 100 does not require additional hardware and the like. Further, usage of a service by a malicious user with arrogating position information can be prevented, and hence the effect of being capable of preventing loss to a service provider associated with the position information can be obtained.

Further, as compared to the self-position measurement, the third-party measurement increases a load on by a user having to perform an approval operation and increases a load on the AGPS server. However, the third-party measurement requirement determination unit 122 of the service server 120 performs the third-party measurement only in the case where determination of the third-party measurement is required. Thus, the effect of reducing the load on the user and the load on the AGPS server can be obtained.

Figure 7:
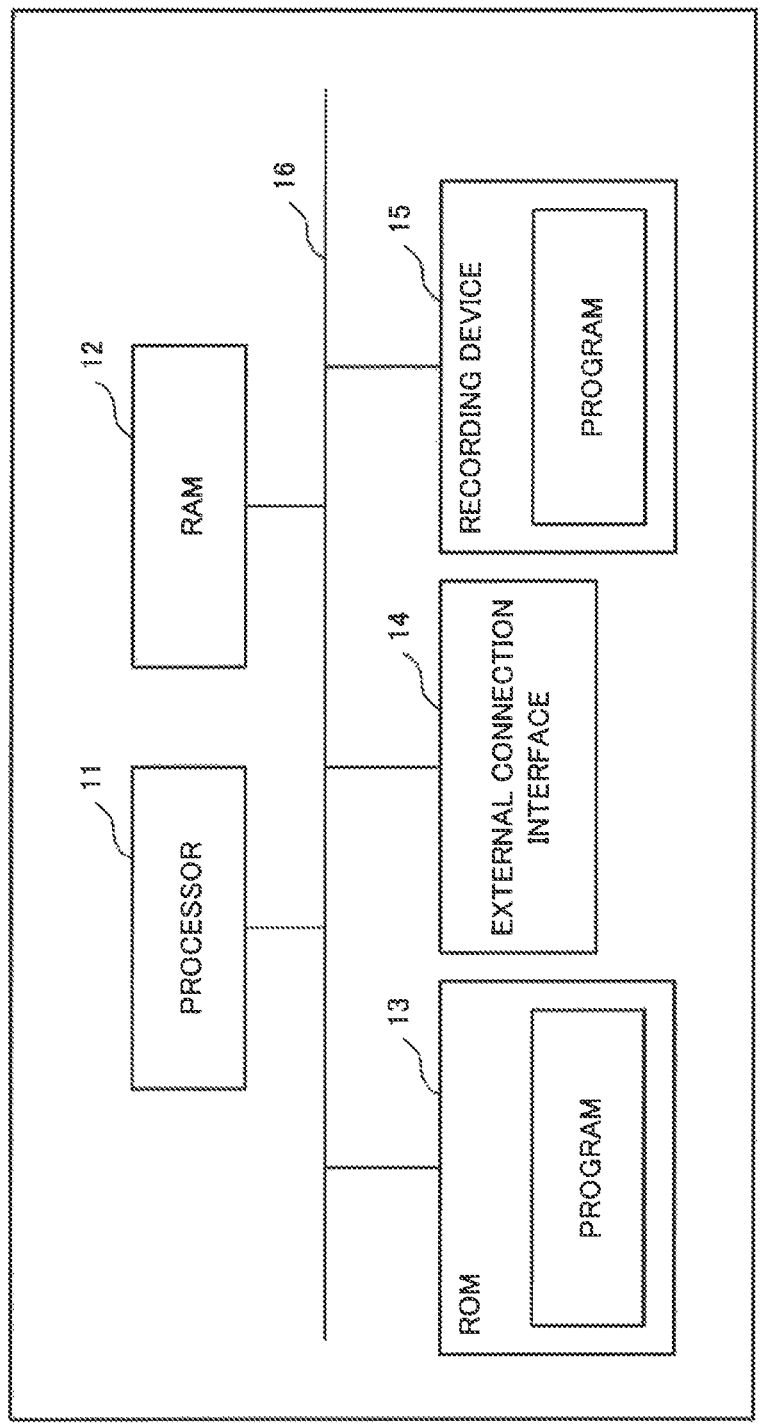
FIG. 7 is a diagram illustrating an example of a hardware configuration for achieving the device provided in each example embodiment.

Each unit of the AGPS server 110, the service server 120, and the mobile terminal 130 illustrated in FIG. 1 and FIG. 3, is achieved with hardware resources illustrated in FIG. 7. In other words, the configuration illustrated in FIG. 7 includes a processor 11, a random access memory (RAM) 12, a read only memory (ROM) 13, an external connection interface 14, a storage device 15, and a bus 16 for connecting those components with each other.

In each example embodiment described above, as an example executed by the processor 11 illustrated in FIG. 7, description is made to the case where a computer program capable of achieving the above-mentioned function is provided to the service server 120 and then, the processor 11 reads the computer program in the RAM 12 and executes the computer program, thereby achieving the function. However, the function shown in each block of the service server 120 in FIG. 1 and FIG. 3 may be partially or entirely achieved as hardware.

The provided computer program may be stored in a readable and writable memory (temporary storage medium) or a computer-readable storage device such as a hard disk device. Further, in such a case, it can be understood that the present invention includes a code indicating the computer program or a storage medium storing the computer program.

With reference to the above-mentioned example embodiments, the present invention has been described. However, the present invention is not limited to the above-mentioned example embodiments. In other words, within the scope of the present invention, the present invention may employ various modes that the person skilled in the art could understand, such as various combinations of or selections among the above-mentioned various disclosed elements.

This application is based upon and claims the benefit of priority from Japanese patent application No. 2016-102577, filed on May 23, 2016, the disclosure of which is incorporated herein in its entirety by reference.

REFERENCE SIGNS LIST

1 Service provision device
2 Third-party measurement request unit
3 provision unit
11 Processor
12 RAM
13 ROM
14 External connection interface
15 Recording device
16 Bus
100 Service provision system
110, 110-1 to 110-3 AGPS server
111 Third-party measurement receiving unit
120 Service server
121 Service request receiving unit 122 Third-party measurement requirement determination unit
123 Third-party measurement request unit
124 Measurement result comparison unit
125 Request destination information storage unit
130 Mobile terminal
131 Application execution unit
132 Measurement unit
140-1 to 140-3 Mobile communication network

What is claimed is:

1. A service provision device comprising:
a memory storing instructions; and
one or more processors configured to execute the instructions to:
request measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs;
compare position information of the mobile terminal measured by a measurement unit in response to the request for providing the service with position information of mobile terminal measured by request from the third-party measurement device, and notify a result of the comparison, the measurement unit is provided in the mobile terminal; and
provide the service to the mobile terminal, based on the result of the comparison acquired.

2. The service provision device according to claim 1, wherein the one or more processors are further configured to execute the instructions to: provide the service, based on the position information of the mobile terminal being measured by the measurement unit provided in the mobile terminal, when the result of the comparison acquired satisfies a predetermined condition.

3. The service provision device according to claim 2, wherein
the one or more processors are further configured to execute the instructions to:
request the measurement to the third-party measurement device when the third-party measurement is determined to be required.

4. The service provision device according to claim 2, wherein
the one or more processors are further configured to execute the instructions to:
provide the service, based on the position information of the mobile terminal measured by the measurement unit provided in the mobile terminal when it is determined that the third-party measurement is not required.

5. The service provision device according to claim 1, wherein the one or more processors are further configured to execute the instructions to: request the measurement to the third-party measurement device when the third-party measurement is determined to be required.

6. The service provision device according to claim 1, wherein the one or more processors are further configured to execute the instructions to: provide the service, based on the position information of the mobile terminal measured by the measurement unit provided in the mobile terminal when it is determined that the third-party measurement is not required.

7. The service provision device according to, claim 1, wherein
the one or more processors are further configured to execute the instructions to:
request the measurement to the third-party measurement device when the third-party measurement is determined to be required.

8. The service provision device according to claim 7, wherein
the one or more processors are further configured to execute the instructions to:
determine that the third-party measurement is required when a predetermined time elapses from when the service is provided.

9. The service provision device according to claim 1, wherein
the one or more processors are further configured to execute the instructions to:
provide the service, based on the position information of the mobile terminal measured by the measurement unit provided in the mobile terminal when it is determined that the third-party measurement is not required.

10. A service provision method comprising:
requesting measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs;
comparing position information of the mobile terminal measured by a measurement unit in response to the request for providing the service with position information of mobile terminal measured by request from the third-party measurement device; and
providing the service to the mobile terminal, based on the result of the comparison acquired.

11. A non-transitory computer readable program storage medium storing a program causing a computer to execute:
requesting measurement of a mobile terminal to a third-party measurement device when receiving a request for providing a service associated with position information from the mobile terminal, information of the third-party measurement device being stored in advance and the third-party measurement device being associated with a mobile communication network to which the mobile terminal belongs;
a processing of comparing position information of the mobile terminal measured by a measurement unit in response to the request for providing the service with position information of mobile terminal measured by request from the third-party measurement device; and
a processing of providing the service to the mobile terminal, based on the result of the comparison acquired.

* * * * *